United States Patent
Chen et al.

(10) Patent No.: US 12,293,530 B2
(45) Date of Patent: May 6, 2025

(54) TRACKING METHOD FOR TRACKING MEASUREMENT SYSTEM, TRACKING SYSTEM, AND TRACKING APPARATUS

(71) Applicant: SCANTECH (HANGZHOU) CO., LTD., Hangzhou (CN)

(72) Inventors: Shangjian Chen, Hangzhou (CN); Jiangfeng Wang, Hangzhou (CN); Jun Zheng, Hangzhou (CN); Yuju Yang, Hangzhou (CN); Lidan Zhang, Hangzhou (CN)

(73) Assignee: SCANTECH (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 18/646,407

(22) Filed: Apr. 25, 2024

(65) Prior Publication Data
US 2024/0362800 A1    Oct. 31, 2024

(30) Foreign Application Priority Data
Apr. 25, 2023    (CN) .......................... 202310467293.3

(51) Int. Cl.
*G06T 7/246*    (2017.01)
*G06T 7/73*    (2017.01)
*G06V 10/44*    (2022.01)

(52) U.S. Cl.
CPC .............. *G06T 7/246* (2017.01); *G06T 7/73* (2017.01); *G06V 10/44* (2022.01)

(58) Field of Classification Search
CPC ............ G06T 7/246; G06T 7/73; G06V 10/44
See application file for complete search history.

(56) References Cited

U.S. PATENT DOCUMENTS

| | | | | |
|---|---|---|---|---|
| 2009/0015681 A1* | 1/2009 | Pipkorn | ............... | H04N 23/959 348/E5.045 |
| 2014/0160243 A1* | 6/2014 | Tsuyuki | ................. | H04N 23/73 348/46 |
| 2016/0227104 A1* | 8/2016 | Guan | ...................... | H04N 25/53 |
| 2020/0217662 A1* | 7/2020 | Gächter Toya | .......... | G01C 1/04 |
| 2021/0312642 A1* | 10/2021 | Zhang | ..................... | G06F 18/22 |
| 2022/0100979 A1* | 3/2022 | Fernandez-Dorado | | G06K 7/10811 |
| 2022/0245827 A1* | 8/2022 | Chen | ..................... | H04N 23/695 |
| 2022/0303445 A1* | 9/2022 | Skaff | ...................... | H04N 23/57 |
| 2022/0370895 A1* | 11/2022 | Wu | ....................... | A63F 13/211 |
| 2024/0096049 A1* | 3/2024 | Saini | ..................... | H04N 23/71 |

OTHER PUBLICATIONS

Xiong Deng, Yan Wu, A. M. Khalid, Xi Long, and Jean-Paul M. G. Linnartz, LED power consumption in joint illumination and communication system, Optics Express vol. 25, Issue 16, pp. 18990-19003 (2017) https://doi.org/10.1364/OE.25.018990 (Year: 2017).*

* cited by examiner

*Primary Examiner* — Ian L Lemieux
(74) *Attorney, Agent, or Firm* — Osha Bergman Watanabe & Burton LLP

(57) ABSTRACT

A tracking method for a tracking measurement system including a tracking apparatus is provided. The method includes acquiring a current tracking distance between the tracking apparatus and a to-be-tracked object, and determining, based on the current tracking distance, a tracking parameter level for the tracking apparatus.

21 Claims, 7 Drawing Sheets

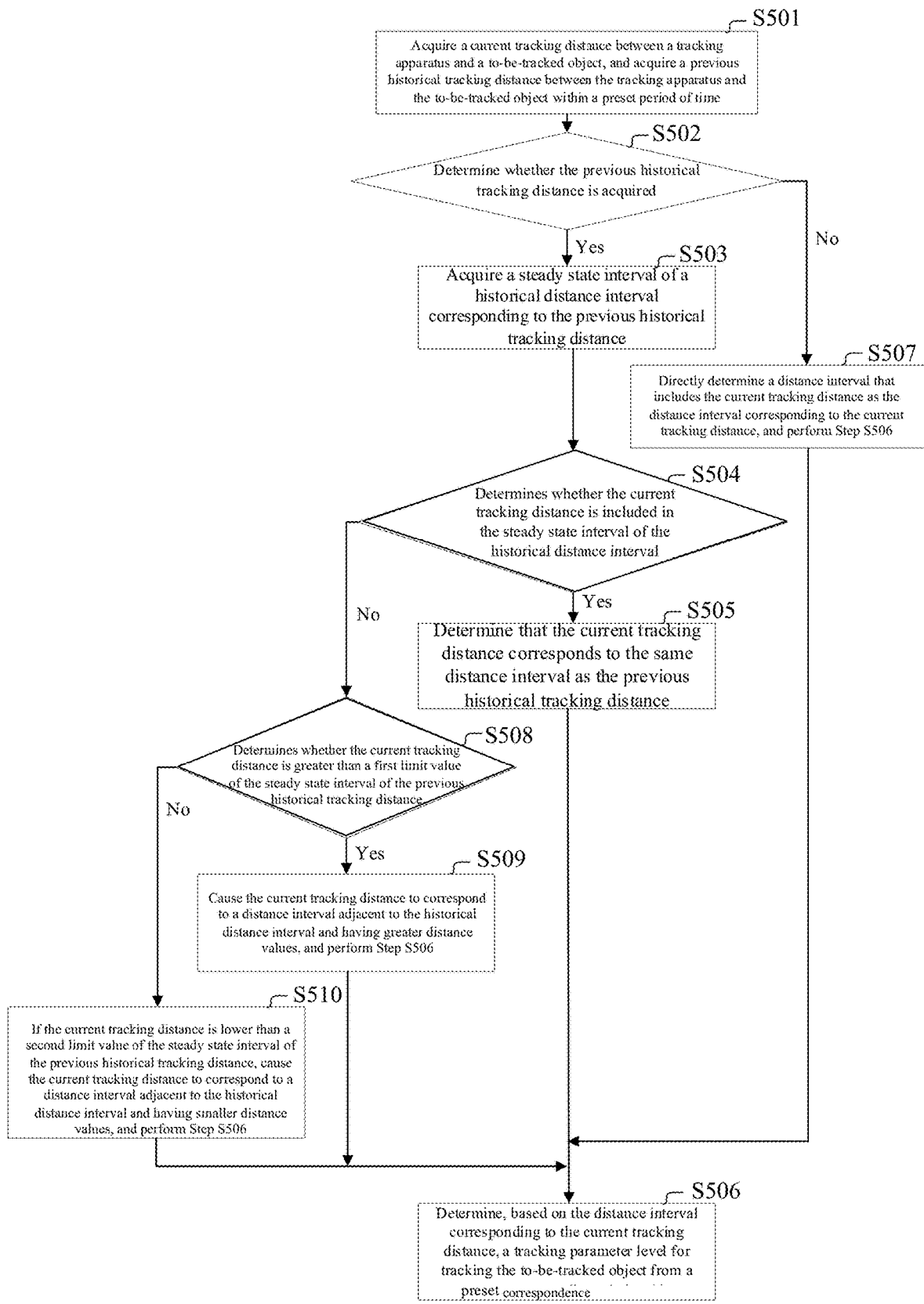

TRACKING METHOD FOR TRACKING MEASUREMENT SYSTEM, TRACKING SYSTEM, AND TRACKING APPARATUS

TECHNICAL FIELD

The present application relates to the field of tracking-type three-dimensional scanning, in particular to a tracking method for a tracking measurement system, a tracking system, and a tracking apparatus.

BACKGROUND

In the tracking-type scanning technology, a to-be-tracked object will keep moving within a distance where the object can be tracked by a tracking apparatus, so that three-dimensional surface data of the measured object is acquired.

During optical tracking of the to-be-tracked object by the tracking apparatus, a distance between the to-be-tracked object and the tracking apparatus may become farther or closer, resulting in overexposure or underexposure of a tracking image including the to-be-tracked object captured by the tracking apparatus. Thus, pose information of the to-be-tracked object acquired from the captured tracking image is imprecise, which in turn affects the overall tracking accuracy and measurement accuracy.

SUMMARY

One or more embodiments provide a tracking method for a tracking measurement system, a tracking system, and a tracking apparatus.

In a first aspect, one or more embodiments provide a tracking method for a tracking measurement system. The tracking measurement system includes a tracking apparatus. The method includes:
acquiring a current tracking distance between the tracking apparatus and a to-be-tracked object; and
determining, based on the current tracking distance, a tracking parameter level for the tracking apparatus.

In some embodiments, the tracking method further includes:
acquiring a tracking feature of the to-be-tracked object;
determining, based on the tracking feature of the to-be-tracked object, location information of the to-be-tracked object; and
determining, based on the location information, the current tracking distance between the tracking apparatus and the to-be-tracked object.

In some embodiments, the tracking method further includes:
acquiring, based on a preset initial tracking parameter level, an initial tracking image of the to-be-tracked object; and determining a tracking feature from the initial tracking image.

In some embodiments, the tracking parameter level includes at least one of:
a camera exposure parameter for the tracking apparatus; and
a tracking feature parameter for the to-be-tracked object, the tracking feature parameter including: a light supplementing parameter when a tracking feature of the to-be-tracked object emits light passively; and a light emitting parameter when the tracking feature emits light actively.

In some embodiments, determining, based on the current tracking distance, a tracking parameter level for the tracking apparatus includes:
determining, based on the current tracking distance, a corresponding distance interval; and
determining, based on the distance interval, a tracking parameter level for tracking the to-be-tracked object from a preset correspondence, wherein the correspondence is a mapping between a plurality of distance intervals and a plurality of tracking parameter levels.

In some embodiments, determining, based on the current tracking distance, a corresponding distance interval includes:
acquiring a previous historical tracking distance between the tracking apparatus and the to-be-tracked object within a preset period of time; and
based on determining that the current tracking distance is outside a distance interval corresponding to the previous historical tracking distance two or more consecutive times, adjusting the distance interval corresponding to the current tracking distance.

In some embodiments, determining, based on the current tracking distance, a corresponding distance interval includes:
acquiring a previous historical tracking distance between the tracking apparatus and the to-be-tracked object within a preset period of time; and
based on determining that the previous historical tracking distance within the preset period of time does not exist, determining a distance interval that includes the current tracking distance as the distance interval corresponding to the current tracking distance.

In some embodiments, determining, based on the current tracking distance, a corresponding distance interval includes:
acquiring a previous historical tracking distance between the tracking apparatus and the to-be-tracked object within a preset period of time;
based on determining that the previous historical tracking distance within the preset period of time exists, acquiring a steady state interval of a historical distance interval corresponding to the previous historical tracking distance, wherein the steady state interval includes the distance interval and a buffer interval preset at an end of the distance interval; and
determining, based on a comparison of the current tracking distance with the steady state interval of the historical distance interval, the distance interval corresponding to the current tracking distance.

In some embodiments, determining, based on a comparison of the current tracking distance with the steady state interval of the historical distance interval, the distance interval corresponding to the current tracking distance includes:
based on determining that the current tracking distance is included in the steady state interval of the historical distance interval, determining that the current tracking distance corresponds to the same distance interval as the previous historical tracking distance.

In some embodiments, determining, based on a comparison of the current tracking distance with the steady state interval of the historical distance interval, the distance interval corresponding to the current tracking distance includes:
based on determining that the current tracking distance is greater than a first limit value of the steady state interval of the previous historical tracking distance, causing the current tracking distance to correspond to a distance interval adjacent to the historical distance interval and having greater distance values; and based on determining that the current tracking distance is smaller than a second limit value of the steady state interval of the previous historical tracking distance, causing the current tracking distance to correspond to a distance interval adjacent to the historical distance interval and having smaller distance values, wherein the first limit value is greater than the second limit value.

In a second aspect, one or more embodiments provide a tracking system for tracking measurement. The tracking system includes:

a tracking parameter adjustment module configured to: acquire a current tracking distance between a tracking apparatus and a to-be-tracked object; and determine, based on the current tracking distance, a tracking parameter level for the tracking apparatus.

In some embodiments, the tracking system further includes:

a tracking distance determination module configured to: acquire a tracking feature of the to-be-tracked object; determine, based on the tracking feature, location information of the to-be-tracked object; and determine, based on the location information, the current tracking distance.

In some embodiments, the tracking system further includes:

a tracking image determination module configured to acquire, based on a preset initial tracking parameter level, an initial tracking image of the to-be-tracked object in order to make an exposure intensity of the acquired initial tracking image moderate; and a tracking feature determination module configured to determine a tracking feature from the initial tracking image.

In some embodiments, the tracking parameter level includes at least one of:

a camera exposure parameter for the tracking apparatus; and a tracking feature parameter for the to-be-tracked object, the tracking feature parameter including: a light supplementing parameter when a tracking feature of the to-be-tracked object emits light passively; and a light emitting parameter when the tracking feature emits light actively.

In some embodiments, the tracking system further includes:

a distance interval determination module configured to determine, based on the current tracking distance, a corresponding distance interval, wherein the tracking parameter adjustment module is further configured to: determine, based on the distance interval, a tracking parameter level for tracking the to-be-tracked object from a preset correspondence, wherein the correspondence is a mapping between a plurality of distance intervals and a plurality of tracking parameter levels.

In some embodiments, the distance interval determination module is configured to:

acquire a previous historical tracking distance between the tracking apparatus and the to-be-tracked object within a preset period of time; and based on determining that the current tracking distance is outside a distance interval corresponding to the previous historical tracking distance two or more consecutive times, adjust the distance interval corresponding to the current tracking distance.

In some embodiments, the distance interval determination module is configured to:

acquire a previous historical tracking distance between the tracking apparatus and the to-be-tracked object within a preset period of time; and based on determining that the previous historical tracking distance within the preset period of time does not exist, determine a distance interval that includes the current tracking distance as the distance interval corresponding to the current tracking distance.

In some embodiments, the distance interval determination module is configured to:

acquire a previous historical tracking distance between the tracking apparatus and the to-be-tracked object within a preset period of time;

based on determining that the previous historical tracking distance within the preset period of time exists, acquire a steady state interval of a historical distance interval corresponding to the previous historical tracking distance, wherein the steady state interval includes the distance interval and a buffer interval preset at an end of the distance interval; and determine, based on a comparison of the current tracking distance with the steady state interval of the historical distance interval, the distance interval corresponding to the current tracking distance.

In some embodiments, the distance interval determination module is configured to:

based on determining that the current tracking distance is included in the steady state interval of the historical distance interval, determine that the current tracking distance corresponds to the same distance interval as the previous historical tracking distance.

In some embodiments, the distance interval determination module is configured to:

based on determining that the current tracking distance is greater than a first limit value of the steady state interval of the previous historical tracking distance, cause the current tracking distance to correspond to a distance interval adjacent to the historical distance interval and having greater distance values; and based on determining that the current tracking distance is smaller than a second limit value of the steady state interval of the previous historical tracking distance, cause the current tracking distance to correspond to a distance interval adjacent to the historical distance interval and having smaller distance values, wherein the first limit value is greater than the second limit value.

In a third aspect, one or more embodiments provide a tracking apparatus. The tracking apparatus includes:

a camera configured to acquire a tracking image of a to-be-tracked object, wherein an exposure parameter of the camera is adjusted based on a current tracking distance between the tracking apparatus and the to-be-tracked object.

In some embodiments, the tracking apparatus further includes:

a light supplementing module configured to supplement light when the camera acquires the tracking image of the to-be-tracked object, wherein a light supplementing parameter of the light supplementing module is adjusted based on the current tracking distance between the tracking apparatus and the to-be-tracked object.

In a fourth aspect, one or more embodiments provide a measurement apparatus. The measurement apparatus includes:

a tracking feature configured to assist a tracking apparatus in positioning the measurement apparatus from an acquired tracking image, wherein the tracking feature includes a light emitting module, and a light emitting parameter of the light emitting module is adjusted based on a current tracking distance from the tracking apparatus.

In the tracking method for the tracking measurement system, the tracking system, and the tracking apparatus according to one or more embodiments, the current tracking distance between the tracking apparatus and the to-be-tracked object is acquired, and the tracking parameter level for the tracking apparatus is determined based on the current tracking distance. Tracking of the to-be-tracked object by the tracking apparatus can be performed based on the tracking parameter level suitable for the current tracking distance, so that a recognition rate of a tracking feature can be increased during binocular reconstruction at different tracking distances, thus improving the tracking accuracy of the tracking apparatus for the to-be-tracked object and improving the overall measurement accuracy of a tracking measurement process.

Details of one or more embodiments of the present application are set forth in the following accompanying drawings and description in order to make other features, objectives and advantages of the present application more concise and understandable.

BRIEF DESCRIPTION OF DRAWINGS

The accompanying drawings illustrated herein are used to provide a further understanding of the present application and constitute part of the present application. The schematic embodiments of the present application and the description thereof are used to explain the present application and do not constitute a limitation on the present application. In the figures:

FIG. 5 is a flow diagram of a tracking method for a tracking measurement system according to one or more embodiments of the present application.

DETAILED DESCRIPTION

In order to better understand the objectives, technical solutions and advantages of the present application, the present application is described and illustrated below with reference to the accompanying drawings and embodiments.

Unless otherwise defined, the technical or scientific terms as used in the present application shall have the ordinary meaning understood by a person of ordinary skill in the art to which the present application pertains. The words "one", "a", "a kind of", "the", "these" and the like in the present application do not denote quantitative limitations and may be singular or plural. The terms "comprise", "include", "have" and any variations thereof, as used in the present application, are intended to cover non-exclusive inclusions. For example, processes, methods, systems, products, or devices including a series of steps or modules (units) are not limited to the listed steps or modules (units), but may include steps or modules (units) that are not listed or may include other steps or modules (units) that are inherent to the processes, methods, products, or devices. The terms "connecting", "connected", "coupled" and the like as used in the present application are not limited to physical or mechanical connections, but may include an electrical connection, whether it is direct or indirect connection. The term "a plurality of" as used in the present application means two or more. "And/or" describes an association relationship of associated objects, which means that three relationships may exist. For example, "A and/or B" may mean three cases: A alone, A and B at the same time, and B alone. The character "/" generally indicates that associated objects are in an "or" relationship. The terms "first", "second", "third", etc., as used in the present application, are only to distinguish similar objects and do not represent a specific ordering of the objects.

Figure 1:
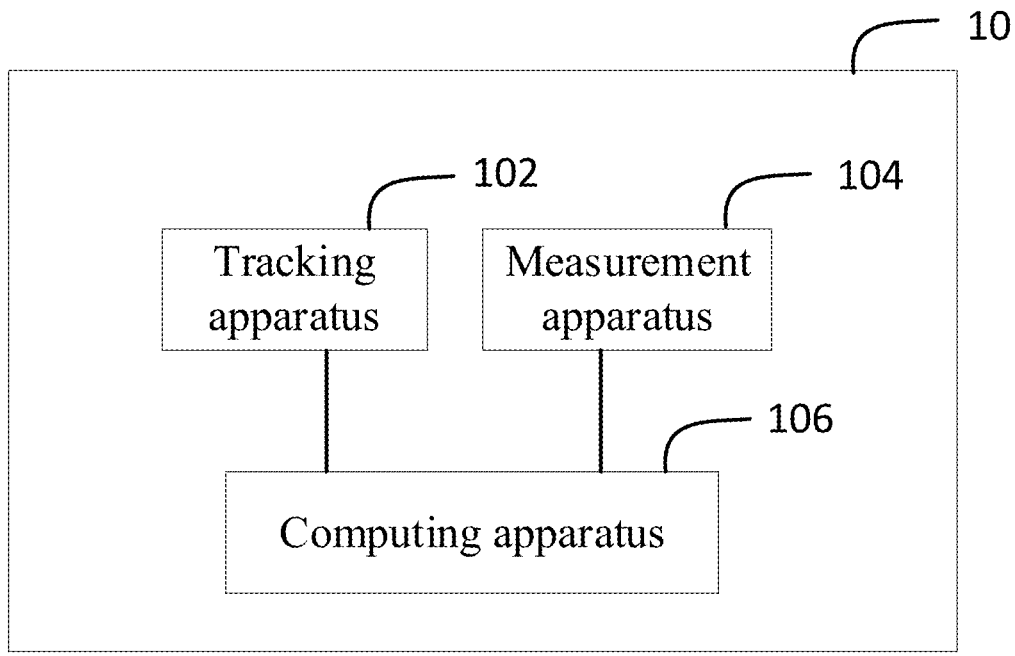
FIG. 1 is a schematic structural diagram of a tracking measurement system according to one or more embodiments of the present application.

FIG. 1 is a schematic structural diagram of a tracking measurement system 10 according to one or more embodiments of the present application. As shown in FIG. 1, the tracking measurement system 10 includes a tracking apparatus 102, a measurement apparatus 104, and a computing apparatus 106. The tracking apparatus 102 and the measurement apparatus 104 are connected to the computing apparatus 106 in a wireless or wired manner. The measurement apparatus 104 transmits measurement data obtained by measuring a measured object to the computing apparatus 106. The tracking apparatus 102 tracks the measurement apparatus 104 in the process that the measurement apparatus 104 measures the measured object, in which case the measurement apparatus 104 is a to-be-tracked object. The tracking apparatus 102 transmits a tracking image including the measurement apparatus 104 to the computing apparatus 106. The computing apparatus 106 performs three-dimensional reconstruction on the measured object based on the received measurement data and tracking image, to obtain a three-dimensional model of the measured object. Further, in the process that the tracking apparatus 102 tracks the measurement apparatus 104, the computing apparatus 106 adjusts a tracking parameter based on a tracking distance between the tracking apparatus 102 and the measurement apparatus 104, and applies a tracking parameter level to the tracking of the measurement apparatus 104 by the tracking apparatus 102. For example, the computing apparatus 106 may be an electronic mobile device, a computer, or a server. The computing apparatus 106 may internally include a processor, a memory, a transmission device, an input/output device, and the like.

Next, the application of the tracking measurement system 10 in a scanning scenario of an aircraft wing is illustrated as an example. The measurement apparatus 104 is used for moving to different measurement positions to perform three-dimensional measurement on different local areas of the wing to obtain measurement data of each of the local areas of the wing. The tracking apparatus 102 tracks the measurement apparatus 104 during movement of the measurement apparatus 104 to obtain a tracking image of the measurement apparatus 104. The computing apparatus 106 performs three-dimensional reconstruction on the wing based on the received measurement data and tracking image to obtain a three-dimensional model of the measured object desired by a user. The computing apparatus 106 may adjust a tracking parameter level for the tracking process based on the tracking distance between the tracking apparatus 102 and the measurement apparatus 104 during the tracking of the measurement apparatus 104 by the tracking apparatus 102. The tracking parameter level includes at least one of: a camera exposure parameter for a camera on the tracking apparatus; a light supplementing parameter for supplementing light for the measurement apparatus 104; and a light emitting parameter of a tracking feature on the measurement apparatus 104 that may emit light actively.

Figure 2:
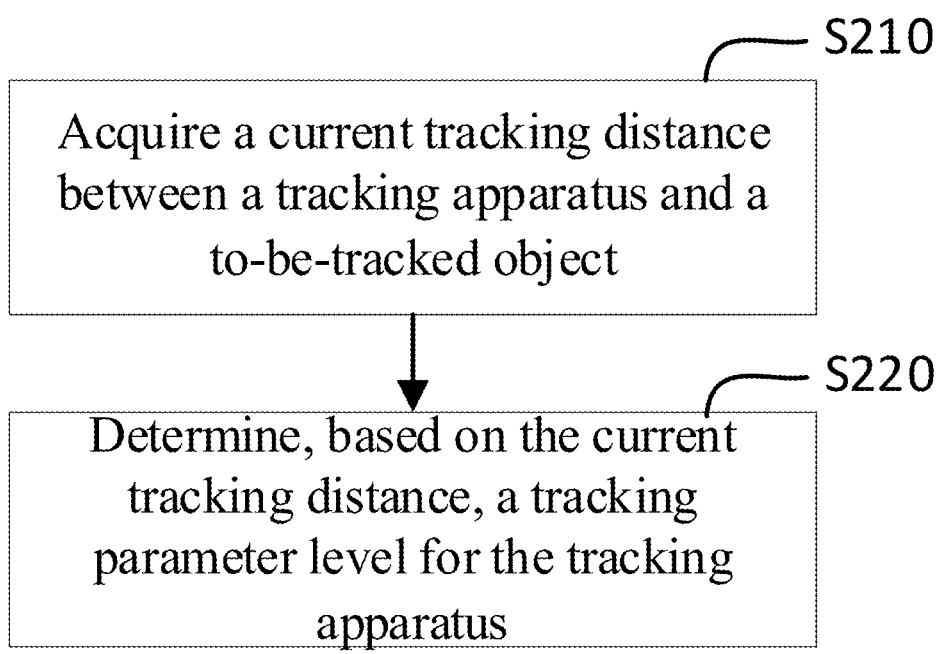
FIG. 2 is a flow diagram of a tracking method for a tracking measurement system according to one or more embodiments of the present application.

One or more embodiments of the present application provide a tracking method for a tracking measurement system. FIG. 2 is a flow diagram of the tracking method for the tracking measurement system according to one or more embodiments of the present application. As shown in FIG. 2, the process includes the following steps.

In Step S210, a current tracking distance between a tracking apparatus and a to-be-tracked object is acquired.

The tracking apparatus may specifically be an optical tracker provided with a camera, for example, an optical tracker provided with a pair of cameras and based on binocular vision reconstruction. The to-be-tracked object refers to a measurement apparatus for collecting measurement data of an object, and may specifically be a three-dimensional scanner, a measurement probe, and the like. The to-be-tracked object is provided with a tracking feature, such as a marker, which is easily recognized by the tracking apparatus. An illustration is made by taking the to-be-tracked object being a three-dimensional scanner as an example. In the tracking measurement system, the three-dimensional scanner scans a measured object and acquires three-dimensional data of a surface of the measured object. The tracking apparatus tracks the three-dimensional scanner synchronously with a marker on the three-dimensional scanner as the tracking feature. The three-dimensional data acquired by the three-dimensional scanner is converted to a coordinate system established based on the tracking apparatus, thus completing three-dimensional reconstruction of the measured object. On the one hand, the tracking apparatus may directly determine the current tracking distance between the tracking apparatus and the to-be-tracked object based on a tracking result thereof for the to-be-tracked object during tracking measurement. On the other hand, the current tracking distance between the tracking apparatus and the to-be-tracked object may also be indirectly obtained based on a distance between the tracking apparatus and a fixed position in a tracking measurement scene and a distance between the to-be-tracked object and the fixed position. In addition, a person skilled in the art may also determine the current tracking distance in other ways. The way of acquiring the current tracking distance between the tracking apparatus and the to-be-tracked object is not specifically limited herein.

In Step S220, a tracking parameter level for the tracking apparatus is determined based on the current tracking distance.

In the related art, the tracking apparatus generally tracks a to-be-tracked object at different distances based on the same exposure parameter, so as to obtain corresponding tracking images. It can be seen that in a current tracking measurement method, the tracking apparatus often tracks the to-be-tracked object with a single exposure parameter, so that a recognition rate for a tracking feature of the to-be-tracked object is low during binocular reconstruction of the to-be-tracked objects at different tracking distances, which in turn results in low tracking accuracy of the tracking apparatus for the to-be-tracked object.

In the tracking measurement system, since a to-be-tracked object, such as a three-dimensional scanner and a measurement probe, needs to change a position thereof constantly to collect three-dimensional data of different portions of the measured object, with the change of the position of the to-be-tracked object during operation, a distance between the to-be-tracked object and the tracking apparatus may also change. As a result, the tracking apparatus needs to process tracking images acquired at different tracking distances. Thus, in order to improve the tracking accuracy of the tracking apparatus for the to-be-tracked object, one or more embodiments provide a strategy for adjusting the tracking parameter level based on the current tracking distance.

The tracking parameter level refers to a parameter level that may affect a brightness state of the tracking image obtained when the tracking apparatus tracks the to-be-tracked object, including, but not limited to, an exposure parameter of a camera of the tracking apparatus, a light supplementing parameter of a light supplementing device, or a light emitting parameter of a tracking feature on the to-be-tracked object that may emit light actively. For example, the tracking parameter level may be one or more of the exposure parameter, the light supplementing parameter, and the light emitting parameter. It is to be understood that the tracking parameter level may be preset, that tracking parameters of different levels have different specific values, and that the preset tracking parameter level may be stored in a parameter file for reading. Specifically, the above exposure parameter may be an aperture size, a shutter time, sensitivity, and the like of the camera on the tracking apparatus. The above light supplementing parameter may be supplemental light brightness, a supplemental light waveband, supplemental light duration, and the like. The above light emitting parameter may be light emitting frequency, light emitting power, and the like.

In one or more embodiments, the tracking parameter level to be selected is determined based on the current tracking distance between the tracking apparatus and the to-be-tracked object, so that when the tracking distance between the tracking apparatus and the to-be-tracked object changes, the recognition rate of the tracking apparatus for the tracking feature of the to-be-tracked object is not affected by the change in the tracking distance. In one or more embodiments, a plurality of distance intervals may be predefined based on actual application scenarios, different distance intervals corresponding to different tracking parameter levels. Then the tracking parameter level of the tracking apparatus is determined based on a distance interval that includes the current tracking distance. In one or more embodiments, by adjusting the tracking parameter level for the tracking apparatus based on the current tracking distance, the influence of the change in the tracking distance between the tracking apparatus and the to-be-tracked object on the recognition rate of the tracking feature in the tracking apparatus in the related art may be eliminated. Therefore, compared with the related art, one or more embodiments increase the recognition rate of the tracking apparatus for the tracking feature in the case of binocular reconstruction at different tracking distances, thus improving the tracking accuracy for the to-be-tracked object and improving the overall measurement accuracy of a tracking measurement process.

In one or more embodiments, when the current tracking distance between the tracking apparatus and the to-be-tracked object is determined for the first time, or when data of a tracking distance between the tracking apparatus and the to-be-tracked object is lost for a long period of time as the to-be-tracked object is obstructed or the tracking apparatus fails and restarts, the to-be-tracked object may be tracked by the tracking apparatus based on a preset initial tracking parameter level. The initial tracking parameter level may be a tracking parameter level that is an intermediate level among a plurality of preset tracking parameter levels, or may be a tracking parameter level that is set based on empirical values. It is to be noted that the tracking image obtained by the tracking apparatus based on the initial tracking parameter level does not have serious overexposure or underexposure as an initial tracking parameter adopted is moderate, so that it is easy to extract the tracking feature from the tracking image. In addition, as the position of the to-be-tracked object changes, the current tracking distance between the tracking apparatus and the to-be-tracked object may be acquired at preset time intervals.

In Steps S210 to S220 described above, the current tracking distance between the tracking apparatus and the to-be-tracked object is acquired, and the tracking parameter level for the tracking apparatus is determined based on the current tracking distance. Tracking of the to-be-tracked object by the tracking apparatus can be performed based on the tracking parameter level suitable for the current tracking distance, so that a recognition rate of tracking features can be increased during binocular reconstruction at different tracking distances, thus improving the tracking accuracy of the tracking apparatus for the to-be-tracked object and improving the overall measurement accuracy of a tracking measurement process.

Further, in some embodiments, a tracking feature of the to-be-tracked object is acquired. Location information of the to-be-tracked object is determined based on the tracking feature of the to-be-tracked object. The current tracking distance between the tracking apparatus and the to-be-tracked object is determined based on the location information.

The tracking feature may be extracted from the tracking image obtained when the tracking apparatus tracks the to-be-tracked object. The extracted tracking feature needs to meet requirements for acquiring the pose of the to-be-tracked object, that is, the pose of the to-be-tracked object can be acquired based on the extracted feature. Therefore, after the tracking image of the to-be-tracked object is obtained, a tracking feature that may meet the above requirements is searched for from the tracking image. If the tracking feature that meets the above requirements is found, the tracking feature is reconstructed so as to determine the location information of the to-be-tracked object, thus obtaining the current tracking distance between the tracking apparatus and the to-be-tracked object.

In one or more embodiments, a tracking feature database of the to-be-tracked object is established before tracking the to-be-tracked object. The tracking feature database may be established by the tracking apparatus capturing tracking features on the to-be-tracked object in advance. Different to-be-tracked objects have different surface features, so tracking feature databases constructed correspondingly are also different. For example, a measurement probe and a three-dimensional scanner have different shapes and thus correspond to different tracking feature databases. In addition, the tracking feature databases may also be distinguished based on identification information of to-be-tracked objects, such as the serial number and category, so that a tracking feature database corresponding to the to-be-tracked object may be correctly selected for matching during tracking. Further, in the tracking process, when the to-be-tracked object is a measurement probe, a tracking feature database pre-established for the measurement probe is called. When the to-be-tracked object is a three-dimensional scanner, a tracking feature database pre-established for the three-dimensional scanner is called. The tracking feature extracted from the tracking image is matched to a tracking feature in the called tracking feature database. If the matching is successful, it is confirmed that the tracking feature extracted from the tracking image meets the above requirements; otherwise, the extracted tracking feature may be a background marker or a workpiece marker, rather than the marker on the to-be-tracked object. In addition, at a certain tracking distance, tracking features extracted from the tracking image may also be pre-screened based on a preset radius threshold of the tracking features.

Further, in some embodiments, an initial tracking image of the to-be-tracked object is acquired based on the preset initial tracking parameter level. The tracking feature is determined from the initial tracking image.

The initial tracking parameter level may be a tracking parameter level that is an intermediate level among a plurality of preset tracking parameter levels, or a tracking parameter level that is set based on empirical values. Setting of the initial tracking parameter level needs to satisfy a preset exposure intensity condition for the tracking image. For example, the tracking image obtained by the tracking apparatus based on the initial tracking parameter level does not have serious overexposure or underexposure, so that it is easy to extract the tracking feature from the tracking image. The initial tracking parameter level may be used when the current tracking distance between the tracking apparatus and the to-be-tracked object is determined for the first time, or when data of a tracking distance between the tracking apparatus and the to-be-tracked object is lost for a long period of time as the to-be-tracked object is obstructed or the tracking apparatus fails and restarts. By tracking the to-be-tracked object based on the preset initial tracking parameter level, when the to-be-tracked object is tracked for the first time or when the to-be-tracked object is re-tracked after tracking of the to-be-tracked object is lost, an obtained tracking feature may meet the above requirements, and repeated adjustment of the tracking parameter level is avoided. Thus, the distance between the tracking apparatus and the to-be-tracked object may be quickly estimated, and the tracking efficiency is improved.

In some embodiments, the tracking parameter level includes at least one of a camera exposure parameter for the tracking apparatus and a tracking feature parameter for the to-be-tracked object. The tracking feature parameter includes: a light supplementing parameter when the tracking feature of the to-be-tracked object emits light passively; and a light emitting parameter when the tracking feature emits light actively.

Compared with exposure adjustment based only on an exposure parameter of the tracking apparatus in the related art, one or more embodiments of the present application also consider the influence of a light supplementing factor on the tracking feature in the tracking image, as well as the influence of the light emitting parameter of the tracking feature that emits light actively on the tracking feature in the tracking image. When the tracking feature is a marker made of reflective material, the to-be-tracked object may be subjected to light supplementing through a light supplementing module on the tracking apparatus or an independent light filler during tracking of the to-be-tracked object by the tracking apparatus. By adjusting the light supplementing parameter, the brightness of the tracking feature in the tracking image acquired by the tracking apparatus may be adjusted, and thus the recognition rate of the tracking feature is influenced. Similarly, when the tracking feature is a marker structure that may emit light actively, the recognition rate of the tracking feature may also be influenced by setting the light emitting frequency, light emitting power and other light emitting parameters of the tracking feature. For example, the marker structure that emits light actively may be a marker structure based on an LED technology. Therefore, by introducing the light supplementing parameter and the light emitting parameter on the basis of the exposure parameter, control over the brightness of the tracking feature may be considered from more perspectives, so that the to-be-tracked object may be tracked in a more comprehensive and accurate manner, and the tracking accuracy is further improved.

In some embodiments, Step S220 where the tracking parameter level for the tracking apparatus is determined based on the current tracking distance may specifically include: determining a corresponding distance interval based on the current tracking distance; and determining the tracking parameter level for tracking the to-be-tracked object from a preset correspondence based on the distance interval. The correspondence is a mapping between a plurality of distance intervals and a plurality of tracking parameter levels, and each distance interval corresponds to a tracking parameter level.

Figure 3:
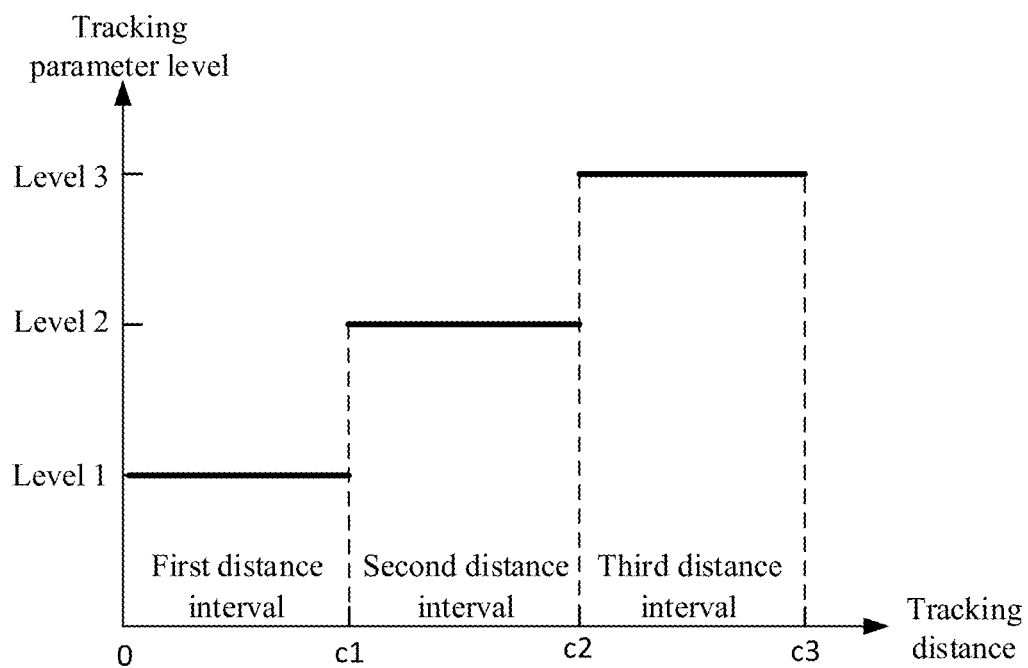
FIG. 3 is a schematic diagram of mapping between distance intervals and tracking parameter levels according to one or more embodiments of the present application.

FIG. 3 is a schematic diagram of mapping between distance intervals and tracking parameter levels according to one or more embodiments. Referring to FIG. 3, horizontal coordinates denote tracking distances, which may be in meters, and vertical coordinates denote tracking parameter levels. Solid horizontal line segments within the coordinate system of FIG. 3 denote a correspondence between the distance intervals and the corresponding tracking parameter levels. Based on preset critical values $c1$, $c2$, and $c3$, a plurality of distance intervals may be determined, for example, a first distance interval from 0 meters to $c1$ meters, a second distance interval from $c1$ meters to $c2$ meters, and a third distance interval from $c2$ meters to $c3$ meters. If the current tracking distance is included in the first distance interval, the tracking parameter level may be determined as Level 1. If the current tracking distance is included in the second distance interval, the tracking parameter level may be determined as Level 2. If the current tracking distance is included in the third distance interval, the tracking parameter level is determined as Level 3. It is to be understood that the above three critical values and the three tracking parameter levels are examples, and a person skilled in the art may set more or less distance intervals and corresponding tracking parameter levels compared to FIG. 3 in a practical application scenario. In addition, when determining whether the current tracking distance is included in a certain distance interval, it may be determined that the current tracking distance is included in the distance interval if the current tracking distance is greater than or equal to a lower limit value of the distance interval and smaller than an upper limit value of the distance interval. Alternatively, it may be determined that the current tracking distance is included in the distance interval if the current tracking distance is greater than the lower limit value of the distance interval and smaller than or equal to the upper limit value of the distance interval. Specific comparison methods are not limited herein.

In some embodiments, determining, based on the current tracking distance, the corresponding distance interval includes: acquiring a previous historical tracking distance between the tracking apparatus and the to-be-tracked object within a preset period of time; and based on determining that the current tracking distance is outside a distance interval corresponding to the previous historical tracking distance two or more consecutive times, adjusting the distance interval corresponding to the current tracking distance.

That is, in one comparison, when the current tracking distance acquired is outside the distance interval of the historical tracking distance acquired in the previous time, comparison results of the current tracking distance with the distance interval of the historical tracking distance need to be acquired two or more consecutive times. If the current tracking distance is outside the distance interval of the historical tracking distance n consecutive times, it is determined that the current tracking distance corresponds to an adjacent distance interval, and the tracking parameter level is adjusted accordingly.

The correspondence between the distance intervals and the tracking parameter levels may be set in a parameter file in advance. When the to-be-tracked object is tracked, after the distance interval corresponding to the current tracking distance is determined based on the current tracking distance, the corresponding tracking parameter level may be determined by reading the parameter file from a preset server. In addition, the correspondence between the distance intervals and the tracking parameter levels may be preset based on actual application scenarios, which is not limited herein. For example, the correspondence may be preset based on a brightness requirement for the tracking feature. In a certain distance interval, the tracking parameter is set such that the brightness of the tracking feature is maintained within a preset brightness range. In this way, tracking parameters corresponding to the distance interval may be determined.

In one or more embodiments, by setting the correspondence between the distance intervals and the tracking parameter levels, the tracking parameter level may be quickly adjusted based on the current tracking distance, to make adjustment of the tracking parameters suitable for the current tracking distance, so that the recognition rate of the tracking feature in the tracking image is increased, thereby improving the tracking accuracy for the to-be-tracked object. In addition, from the perspective of tracking efficiency, by presetting distance intervals for tracking distances, different tracking distances included in the same distance interval may correspond to the same tracking parameter level when the tracking distances change, thereby avoiding frequent adjustment of the tracking parameter level during continuous change of the tracking distance, reducing the amount of calculations of a relevant calculation module in the tracking measurement system, and improving the tracking efficiency.

Further, in some embodiments, determining, based on the current tracking distance, the corresponding distance interval may include: acquiring a previous historical tracking distance between the tracking apparatus and the to-be-tracked object within the preset period of time; and based on determining that the previous historical tracking distance within the preset period of time does not exist, determining a distance interval that includes the current tracking distance as the distance interval corresponding to the current tracking distance.

If the current tracking distance is a tracking distance acquired for the first time in this tracking process, the previous historical tracking distance does not exist within the preset period of time. Alternatively, when it is determined that in the tracking process, tracking of the to-be-tracked object by the tracking apparatus is discontinuous, the previous historical tracking distance within the preset period of time may not be acquired. When the to-be-tracked object is blocked by other objects, or when the tracking apparatus malfunctions, the tracking distance data of the tracking apparatus for the to-be-tracked object may be lost, in which case the tracking of the to-be-tracked object by the tracking apparatus is discontinuous. When the previous historical tracking distance does not exist, the tracking parameter level is directly determined based on the distance interval corresponding to the current tracking distance. For example, referring to FIG. 3, the corresponding tracking parameter level is determined based on the distance interval that includes the current tracking distance.

In addition, in other embodiments, determining, based on the current tracking distance, the corresponding distance interval may include: acquiring a previous historical tracking distance between the tracking apparatus and the to-be-tracked object within the preset period of time; based on determining that the previous historical tracking distance within the preset period of time exists, acquiring a steady state interval of a historical distance interval corresponding to the previous historical tracking distance, where the steady state interval includes the distance interval and a buffer interval preset at an end of the distance interval; and determining the distance interval corresponding to the current tracking distance based on a comparison of the current tracking distance with the steady state interval of the historical distance interval.

That is, the steady state interval is an interval formed by combining the distance interval and the buffer interval provided at an end of the distance interval. Each distance interval corresponds to a steady state interval. When the historical tracking distance is included in one of the distance intervals, the next tracking distance needs to be outside the steady state interval of the historical distance interval to correspond to an adjacent distance interval, and the tracking apparatus switches to a tracking parameter level corresponding to the adjacent distance interval. The buffer interval may be provided only at an upper end or a lower end of the distance interval, or may be provided at both ends of the distance interval. Length of the buffer interval provided at either end may be adaptively set. For example, referring to the table below, buffer intervals are provided at both ends of the distance interval, and the lengths of the buffer intervals at the two ends are set to be 0.1 meters. When the distance interval is 1 meter to 2 meters, a steady state interval of 0.9 meters to 2.1 meters is formed by combining the distance interval with the buffer intervals of 0.1 meters at the two ends of the distance interval, and the corresponding tracking parameter level is T1. Thus, if the historical tracking distance corresponds to this distance interval, the current tracking distance needs to be outside the range of 0.9 meters to 2.1 meters to correspond to other distance intervals so that the corresponding tracking parameter level is adjusted. Similarly, when the distance interval is 2 meters to 3 meters, the steady state interval thereof is 1.9 meters to 3.1 meters, and the corresponding tracking parameter level is T2. When the distance interval is 3 meters to 4 meters, the steady state interval thereof is 2.9 meters to 4.1 meters, and the corresponding tracking parameter level is T3. In this way, when the distance interval is n meters to n+1 meters, the steady state interval thereof is (n−0.1) meters to (n+1.1) meters, and the corresponding tracking parameter level is Tn.

TABLE 1

| Distance interval | Tracking parameter level | Steady state interval |
| --- | --- | --- |
| 1 meter to 2 meters | T1 | 0.9 meters to 2.1 meters |
| 2 meters to 3 meters | T2 | 1.9 meters to 3.1 meters |
| 3 meters to 4 meters | T3 | 2.9 meters to 4.1 meters |
| . . . | . . . | . . . |
| n meters to (n + 1) meters | Tn | (n − 0.1) meters to (n + 1.1) meters |

It is to be noted that the setting of the distance intervals, the tracking parameter levels, and the buffer interval described above may all depend on actual application scenarios. In the tracking measurement system, when the to-be-tracked object or the tracking apparatus undergoes a slight jitter during operation, or when the position of the to-be-tracked object undergoes a slight change within a period of time due to unevenness of a surface of an object measured by the to-be-tracked object, or when there is a small error in calculation of the tracking distance, the tracking distance between the tracking apparatus and the to-be-tracked object may undergo fluctuations within the period of time. If the fluctuations of the tracking distance occur at an end point of a distance interval, the distance interval that includes the tracking distance may change repeatedly. In this case, if the corresponding distance interval is directly acquired based on the current tracking distance and the tracking parameter level is adjusted accordingly, the adjustment of the tracking parameter level may change repeatedly between two adjacent tracking parameter levels following the slight change described above, which in turn affects the tracking accuracy of the tracking apparatus. Thus, in one or more embodiments, with respect to adjustment of the tracking parameter level, in addition to considering the influence of the current tracking distance, the factor of the previous historical tracking distance within the preset period of time is also introduced, and the steady state interval is introduced to determine the tracking parameter level.

Specifically, according to the above table, in the case that the previous historical tracking distance exists, the steady state interval of the historical distance interval corresponding to the previous historical tracking distance is firstly acquired. For example, if the previous historical tracking distance is 1.7 meters and the steady state interval corresponding thereto is 0.9 meters to 2.1 meters, the tracking parameter level set under the previous historical tracking distance is T1. The current tracking distance is 2.05 meters. When compared with the above steady state interval of the historical distance interval, the current tracking distance is still included in the steady state interval corresponding to the previous historical tracking distance. Thus, even if the current tracking distance is outside the historical distance interval of 1 meter to 2 meters corresponding to the previous historical tracking distance, since the steady state interval that includes the current tracking distance has not changed with respect to the previous historical tracking distance, the current tracking distance still corresponds to the historical distance interval. In this case, there is no need to change the tracking parameter level, and the to-be-tracked object may still be tracked with the tracking parameter level of T1.

In addition, according to the above table, there is a certain overlap range between adjacent steady state intervals. For example, the steady state interval of 0.9 meters to 2.1 meters and the steady state interval of 1.9 meters to 3.1 meters have an overlap range of 1.9 meters to 2.1 meters. If a value of the current tracking distance is 2.05 meters, which is exactly within the overlap range, a steady state interval that includes the current tracking distance needs to be determined based on the steady state interval that includes the previous historical tracking distance. Since the previous historical tracking distance is included in the steady state interval of 0.9 meters to 2.1 meters, the current tracking distance may be regarded as included in the steady state interval of 0.9 meters to 2.1 meters. Moreover, since the tracking distance acquired in one or more embodiments is obtained through continuous tracking, tracking distances obtained in two consecutive acquisitions may be included in the same steady state interval or two adjacent steady state intervals respectively.

Based on the above content, in one or more embodiments, the steady state interval is formed by setting the buffer interval for an end of the distance interval, and the distance interval corresponding to the current tracking distance is determined based on the comparison of the current tracking distance with the steady state interval, which may prevent repeated adjustment of the tracking parameter level caused by fluctuations of the tracking distance around an end point of a distance interval.

Further, in some embodiments, determining, based on the comparison of the current tracking distance with the steady state interval of the historical distance interval, the distance interval corresponding to the current tracking distance includes: based on determining that the current tracking distance is included in the steady state interval of the historical distance interval, determining that the current tracking distance corresponds to the same distance interval as the previous historical tracking distance.

In this case, even if the current tracking distance is outside the historical distance interval, since the current tracking distance is not outside the steady state interval that includes the previous historical tracking distance, the current tracking distance is still regarded as corresponding to the same distance interval as the previous historical tracking distance. Therefore, there is no need to adjust the tracking parameter level, thus avoiding repeated adjustment of the tracking parameter level, and improving the tracking accuracy and user experience of the tracking apparatus.

Further, when comparing the current tracking distance with the steady state interval of the historical distance interval, a threshold number of times of determination may also be set. That is, when the current tracking distance is outside the steady state interval of the distance interval corresponding to the previous historical tracking distance, a result of the comparison is recorded. A plurality of consecutive tracking distances calculated thereafter are compared with the steady state interval of the distance interval corresponding to the historical tracking distance, and comparison results are recorded. When the comparison results of n consecutive times are such that the current tracking distance is outside the steady state interval of the previous historical tracking distance, it is determined that the current tracking distance corresponds to an adjacent distance interval, and tracking parameters are adjusted accordingly.

Furthermore, in other embodiments, determining, based on the comparison of the current tracking distance with the steady state interval of the historical distance interval, the distance interval corresponding to the current tracking distance may further include: based on determining that the current tracking distance is greater than a first limit value of the steady state interval of the previous historical tracking distance, causing the current tracking distance to correspond to a distance interval adjacent to the historical distance interval and having greater distance values; and based on determining that the current tracking distance is smaller than a second limit value of the steady state interval of the previous historical tracking distance, causing the current tracking distance to correspond to a distance interval adjacent to the historical distance interval and having smaller distance values, where the first limit value is greater than the second limit value.

Figure 4A:
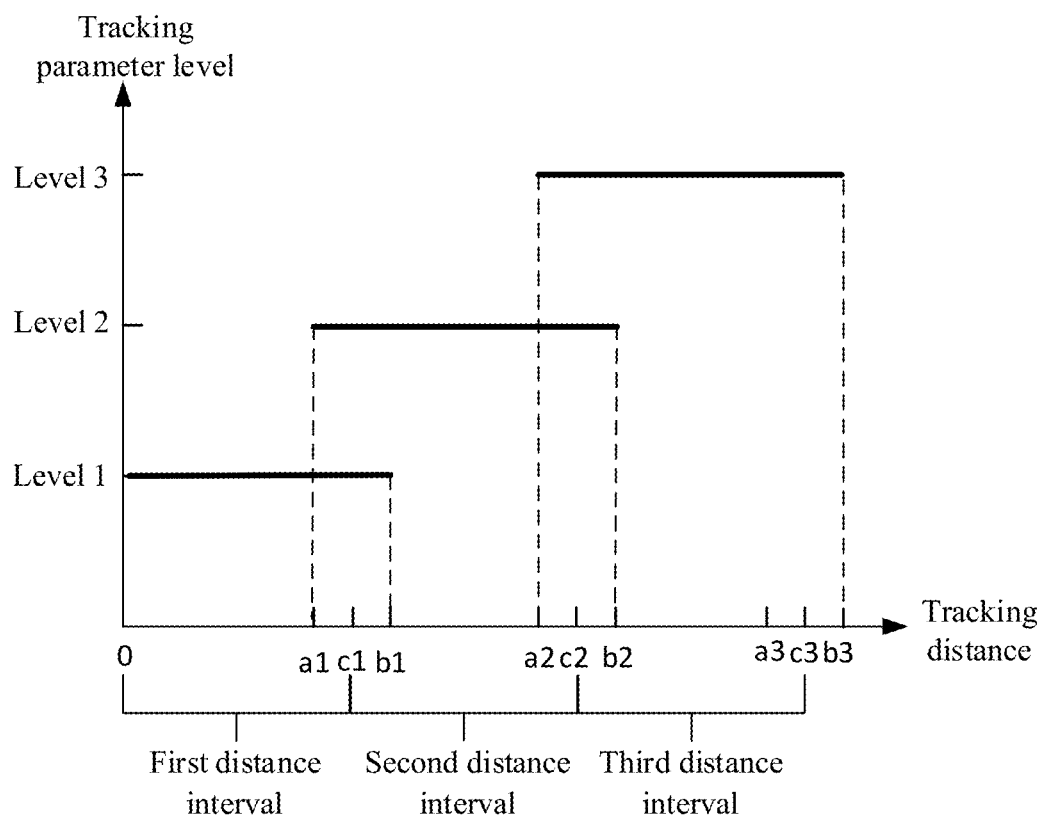
FIG. 4a is a schematic diagram of a correspondence between a distance interval, a steady state interval, and a tracking parameter level according to one or more embodiments of the present application.

FIG. 4a is a schematic diagram of a correspondence between the distance interval, the steady state interval, and the tracking parameter level according to one or more embodiments. An illustration will be made below in conjunction with FIG. 4a. Horizontal coordinates indicate the tracking distance, which may be in meters, and vertical coordinates indicate the tracking parameter level. Solid horizontal line segments in the coordinate system of FIG. 4a indicate a correspondence between the steady state interval that includes the current tracking distance and the tracking parameter level. As shown in FIG. 4a, buffer intervals may be set for an upper end and a lower end of a distance interval respectively. In particular, a first distance interval is 0 meters to c1 meters. Since a lower end of the first distance interval is 0, no buffer interval is set therefor. A buffer interval of c1 meters to b1 meters is set only for an upper end c1 of the first distance interval, so that a first steady state interval of the first distance interval may be 0 meters to b1 meters. Similarly, a second distance interval is c1 meters to c2 meters, a buffer interval of a1 meters to c1 meters is set for a lower end c1 of the second distance interval, and a buffer interval of c2 meters to b2 meters is set for an upper end c2 of the second distance interval, so that a steady state interval of the second distance interval may be a1 meters to b2 meters, which is used as a second steady state interval. A third distance interval is c2 meters to c3 meters, a buffer interval of a2 meters to c2 meters is set for a lower end c2 of the third distance interval, and a buffer interval of c3 meters to b3 meters is set for an upper end c3 of the third distance interval, so that a steady state interval of the third distance interval is a2 meters to b3 meters, which is used as a third steady state interval.

Figure 4B:
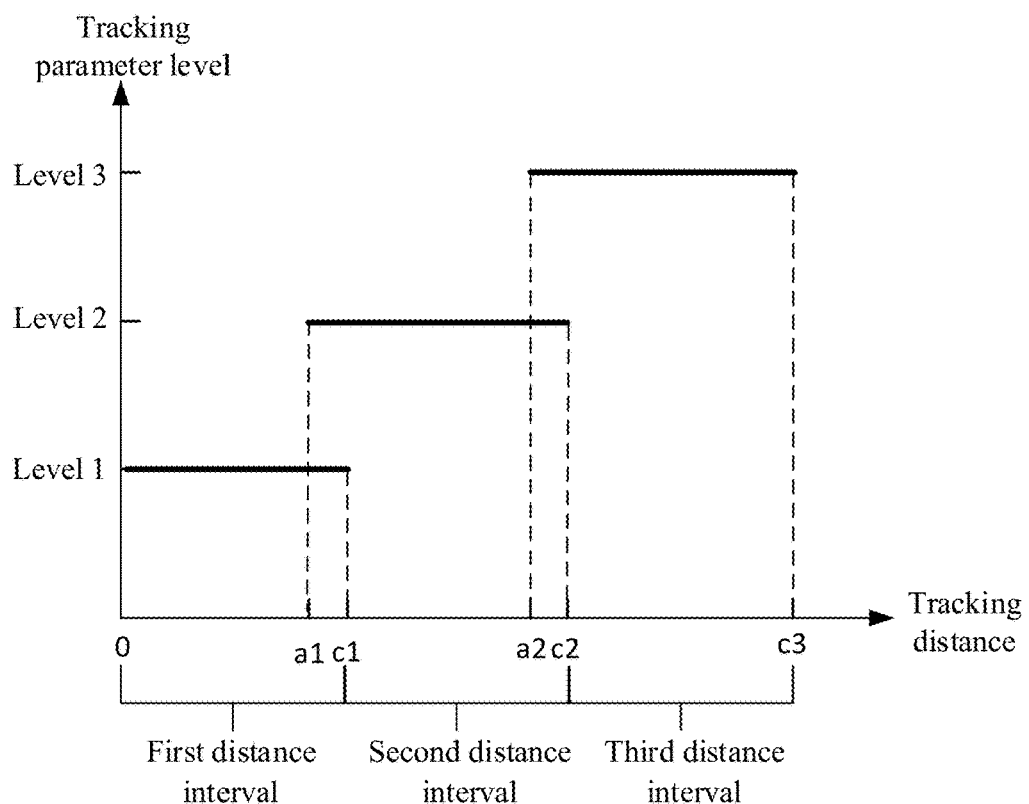
FIG. 4b is a schematic diagram of another correspondence between a distance interval, a steady state interval, and a tracking parameter level according to one or more embodiments of the present application.

Alternatively, a buffer interval may be set only for the lower end of a distance interval to constitute a steady state interval of the distance interval. FIG. 4b is a schematic diagram of another correspondence between the distance interval, the steady state interval, and the tracking parameter level according to one or more embodiments. Horizontal coordinates indicate the tracking distance, which may be in meters, and vertical coordinates indicate the tracking parameter level. Solid horizontal line segments in the coordinate system of FIG. 4b indicate a correspondence between the steady state interval that includes the current tracking distance and the tracking parameter level. As shown in FIG. 4b, similar to FIG. 4a above, since the first distance interval is 0 meters to c1 meters and has a lower end of 0, no buffer interval is set for the first distance interval. The second distance interval is c1 meters to c2 meters, and a buffer interval of a1 meters to c1 meters is set for the lower end c1 of the second distance interval, thus forming a steady state interval of a1 meters to c2 meters of the second distance interval as a second steady state interval. The third distance interval is c2 meters to c3 meters, and a buffer interval of a2 meters to c2 meters is set for the lower end c2 of the third distance interval, thus forming a steady state interval of a2 meters to c3 meters of the third distance interval as a third steady state interval.

Figure 4C:
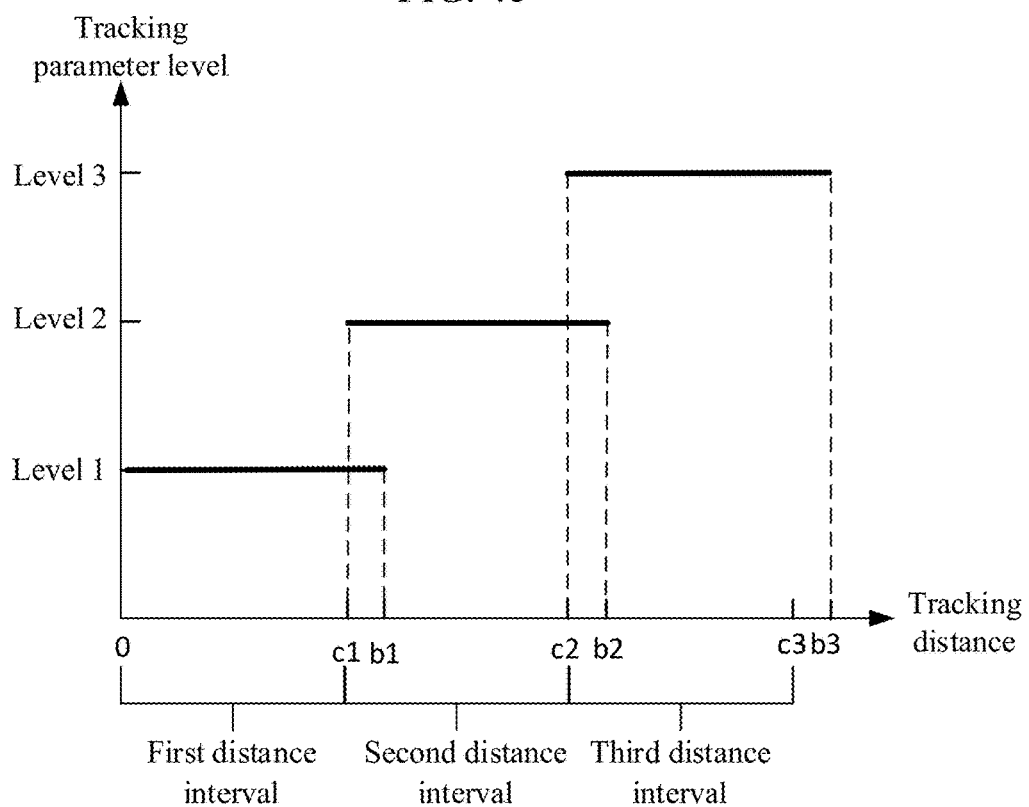
FIG. 4c is a schematic diagram of yet another correspondence between a distance interval, a steady state interval, and a tracking parameter level according to one or more embodiments of the present application.

A buffer interval may also be set only for the upper end of a distance interval to constitute a corresponding steady state interval. FIG. 4c is a schematic diagram of yet another correspondence between the distance interval, the steady state interval, and the tracking parameter level according to one or more embodiments. Horizontal coordinates indicate the tracking distance, which may be in meters, and vertical coordinates indicate the tracking parameter level. Solid horizontal line segments in the coordinate system of FIG. 4c indicate a correspondence between the steady state interval that includes the current tracking distance and the tracking parameter level. As shown in FIG. 4c, the first distance interval is 0 meters to c1 meters, and a buffer interval of c1 meters to b1 meters is set for the upper end c1 of the first distance interval, thus forming a steady state interval of 0 meters to b1 meters of the first distance interval as a first steady state interval. The second distance interval is c1 meters to c2 meters, and a buffer interval of c2 meters to b2 meters is set for the upper end c2 of the second distance interval, thus forming a steady state interval of c1 meters to b2 meters of the second distance interval as a second steady state interval. The third distance interval is c2 meters to c3 meters, and a buffer interval of c3 meters to b3 meters is set for the upper end c3 of the third distance interval, thus forming a steady state interval of c2 meters to b3 meters of the third distance interval as a third steady state interval.

It is to be noted that whether the steady state interval is constituted by setting a buffer interval at the upper end of the distance interval, or setting a buffer interval at the lower end of the distance interval, or setting buffer intervals at both the upper end and the lower end of the distance interval, the process of comparing the steady state interval with the current tracking distance to determine the distance interval corresponding to the current tracking distance is the same. Next, the comparison of the current tracking distance with the steady state interval is illustrated in conjunction with FIG. 4a. If the steady state interval of the previous historical tracking distance is the second steady state interval in FIG. 4a, the first limit value is b2 meters and the second limit value is a1 meters. Therefore, if the current tracking distance is greater than b2 meters, the current tracking distance corresponds to the third distance interval adjacent to the second distance interval and having greater distance values, in which case a tracking parameter level of Level 3 corresponding to the third distance interval is determined as a current tracking parameter level. Similarly, if the current tracking distance is smaller than a1 meters, the current tracking distance corresponds to the first distance interval adjacent to the second distance interval and having smaller distance values, in which case a tracking parameter level of Level 1 corresponding to the first distance interval is determined as the current tracking parameter level.

In particular, if the current tracking distance is included in an overlap portion of adjacent steady state intervals, for example, an overlap portion, a2 meters to b2 meters, of the second steady state interval and the third steady state interval, the steady state interval that includes the current tracking distance needs to be determined based on the steady state interval corresponding to the previous historical tracking distance, so that the distance interval corresponding to the current tracking distance may be determined. For example, if the steady state interval that includes the previous historical tracking distance is the second steady state interval, and the corresponding historical distance interval is the second distance interval, the current tracking distance is also regarded as included in the second steady state interval instead of the third steady state interval, and the current tracking distance is caused to correspond to the second distance interval. If the steady state interval that includes the previous historical tracking distance is the third steady state interval, and the corresponding distance interval is the third distance interval, the current tracking distance is also regarded as included in the third steady state interval, and the corresponding distance interval thereof is the third distance interval. In the case that the previous historical tracking distance does not exist, the distance interval corresponding to the current tracking distance is directly determined based on the comparison of the current tracking distance with the distance interval.

FIG. 5 is a flow diagram of a tracking method for a tracking measurement system according to one or more embodiments. As shown in FIG. 5, the tracking method includes the following steps.

In Step S501, a current tracking distance between a tracking apparatus and a to-be-tracked object is acquired, and a previous historical tracking distance between the tracking apparatus and the to-be-tracked object within a preset period of time is acquired.

In Step S502, whether the previous historical tracking distance is acquired is determined. If the previous historical tracking distance is acquired, Step S503 is performed; otherwise, Step S507 is performed.

In Step S503, a steady state interval of a historical distance interval corresponding to the previous historical tracking distance is acquired.

In Step S504, whether the current tracking distance is included in the steady state interval of the historical distance interval is determined. If the current tracking distance is included in the steady state interval of the historical distance interval, Step S505 is performed; otherwise, Step S508 is performed.

In Step S505, it is determined that the current tracking distance corresponds to the same distance interval as the previous historical tracking distance.

In Step S506, based on the distance interval corresponding to the current tracking distance, a tracking parameter level for tracking the to-be-tracked object is determined from a preset correspondence.

In Step S507, the distance interval that includes the current tracking distance is directly determined as the distance interval corresponding to the current tracking distance, and Step S506 is performed.

In Step S508, whether the current tracking distance is greater than a first limit value of the steady state interval of the previous historical tracking distance is determined. If the current tracking distance is greater than the first limit value of the steady state interval of the previous historical tracking distance, Step S509 is performed; otherwise, Step S510 is performed.

In Step S509, the current tracking distance is caused to correspond to a distance interval adjacent to the historical distance interval and having greater distance values, and Step S506 is performed.

In Step S510, if the current tracking distance is lower than a second limit value of the steady state interval of the previous historical tracking distance, the current tracking distance is caused to correspond to a distance interval adjacent to the historical distance interval and having smaller distance values, and Step S506 is performed.

Figure 6:
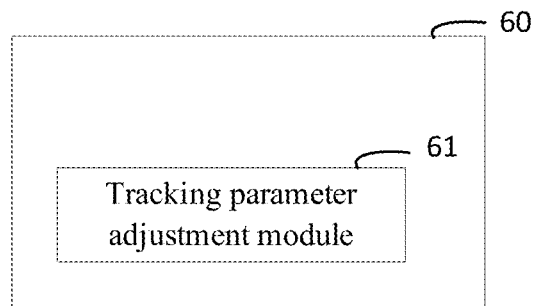
FIG. 6 is a structural block diagram of a tracking system for tracking measurement according to one or more embodiments of the present application.

FIG. 6 is a structural block diagram of a tracking system 60 for tracking measurement according to one or more embodiments of the present application. As shown in FIG. 6, the tracking system 60 includes a tracking parameter adjustment module 61 configured to: acquire a current tracking distance between a tracking apparatus and a to-be-tracked object; and determine, based on the current tracking distance, a tracking parameter level for the tracking apparatus. The tracking system 60 may perform tracking of the to-be-tracked object by the tracking apparatus based on the tracking parameter level suitable for the current tracking distance, so that the recognition rate of a tracking feature may be increased during binocular reconstruction at different tracking distances, thus improving the tracking accuracy of the tracking apparatus for the to-be-tracked object and improving the overall measurement accuracy of a tracking measurement process.

In some embodiments, the tracking parameter level includes at least one of a camera exposure parameter for the tracking apparatus and a tracking feature parameter for the to-be-tracked object. The tracking feature parameter includes: a light supplementing parameter when the tracking feature of the to-be-tracked object emits light passively; and a light emitting parameter when the tracking feature emits light actively.

Figure 7:
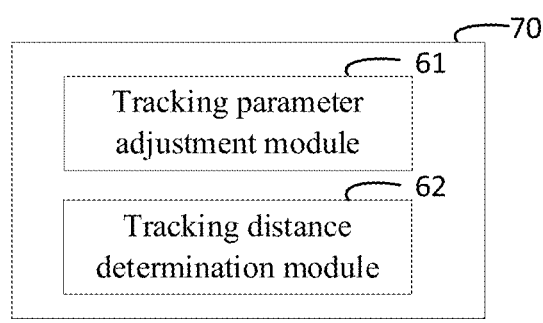
FIG. 7 is a structural block diagram of a tracking system for tracking measurement according to one or more embodiments of the present application.

FIG. 7 is a structural block diagram of a tracking system 70 for tracking measurement according to one or more embodiments of the present application. As shown in FIG. 7, in addition to the tracking parameter adjustment module 61, the tracking system 70 further includes a tracking distance determination module 62 configured to: acquire a tracking feature of the to-be-tracked object; determine, based on the tracking feature, location information of the to-be-tracked object; and determine, based on the location information, the current tracking distance.

Figure 8:
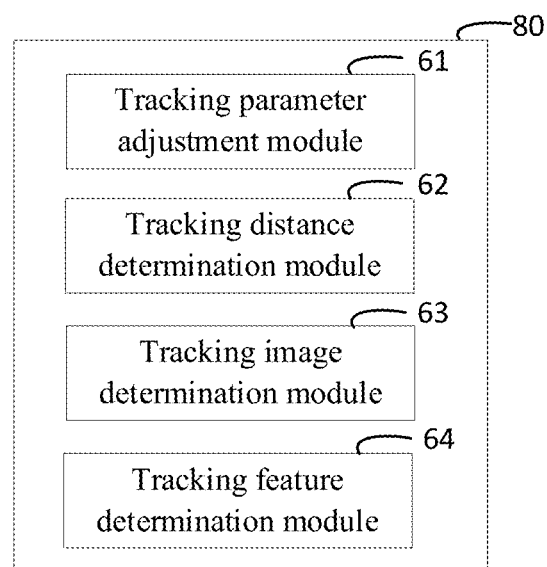
FIG. 8 is a structural block diagram of a tracking system for tracking measurement according to one or more embodiments of the present application.

FIG. 8 is a structural block diagram of a tracking system 80 for tracking measurement according to one or more embodiments of the present application. As shown in FIG. 8, in addition to the tracking parameter adjustment module 61 and the tracking distance determination module 62, the tracking system 80 further includes a tracking image determination module 63 and a tracking feature determination module 64. The tracking image determination module 63 is configured to acquire, based on a preset initial tracking parameter level, an initial tracking image of the to-be-tracked object in order to make the exposure intensity of the acquired initial tracking image moderate. The tracking feature determination module 64 is configured to determine a tracking feature from the initial tracking image.

Figure 9:
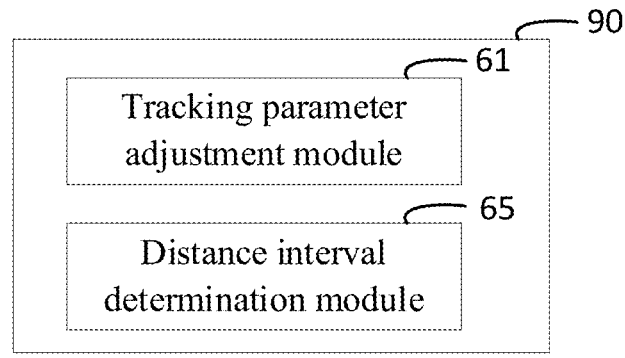
FIG. 9 is a structural block diagram of a tracking system for tracking measurement according to Embodiment 6 of the present application.

FIG. 9 is a structural block diagram of a tracking system 90 for tracking measurement according to one or more embodiments of the present application. As shown in FIG. 9, in addition to the tracking parameter adjustment module 61, the tracking system 90 further includes a distance interval determination module 65 configured to determine, based on the current tracking distance, a corresponding distance interval. The tracking parameter adjustment module 61 is further configured to determine, based on the distance interval, a tracking parameter level for tracking the to-be-tracked object from a preset correspondence. The correspondence is a mapping between a plurality of distance intervals and a plurality of tracking parameter levels.

In some embodiments, the distance interval determination module 65 is configured to: acquire a previous historical tracking distance between the tracking apparatus and the to-be-tracked object within a preset period of time; and based on determining that the current tracking distance is outside a distance interval corresponding to the previous historical tracking distance two or more consecutive times, adjust the distance interval corresponding to the current tracking distance.

In some embodiments, the distance interval determination module 65 is configured to:
acquire a previous historical tracking distance between the tracking apparatus and the to-be-tracked object within the preset period of time; and based on determining that the previous historical tracking distance within the preset period of time does not exist, determine a distance interval that includes the current tracking distance as the distance interval corresponding to the current tracking distance.

In some embodiments, the distance interval determination module 65 is configured to:
acquire a previous historical tracking distance between the tracking apparatus and the to-be-tracked object within the preset period of time; based on determining that the previous historical tracking distance within the preset period of time exists, acquire a steady state interval of a historical distance interval corresponding to the previous historical tracking distance, wherein the steady state interval includes the distance interval and a buffer interval preset at an end of the distance interval; and determine, based on a comparison of the current tracking distance with the steady state interval of the historical distance interval, the distance interval corresponding to the current tracking distance.

In some embodiments, the distance interval determination module 65 is configured to:
based on determining that the current tracking distance is included in the steady state interval of the historical distance interval, determine that the current tracking distance corresponds to the same distance interval as the previous historical tracking distance.

In some embodiments, the distance interval determination module 65 is configured to:
based on determining that the current tracking distance is greater than a first limit value of the steady state interval of the previous historical tracking distance, cause the current tracking distance to correspond to a distance interval adjacent to the historical distance interval and having greater distance values; and based on determining that the current tracking distance is smaller than a second limit value of the steady state interval of the previous historical tracking distance, cause the current tracking distance to correspond to a distance interval adjacent to the historical distance interval and having smaller distance values, where the first limit value is greater than the second limit value.

It is to be noted that each of the modules may be a function module or a program module, and may be implemented either by software or by hardware. For the modules implemented by hardware, each of the modules may be located in the same processor, or each of the modules may also be located in different processors in the form of any combination. Furthermore, the processors may be integrated within the tracking apparatus or may be independent of the tracking apparatus.

Figure 10:
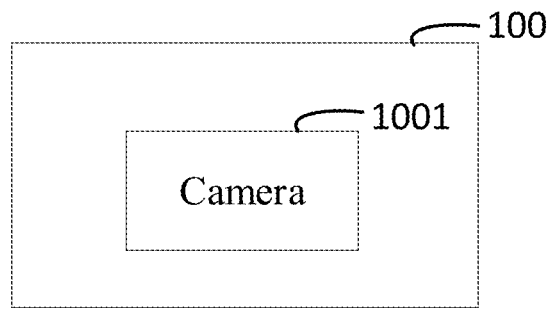
FIG. 10 is a structural block diagram of a tracking apparatus according to one or more embodiments of the present application.

FIG. 10 is a structural block diagram of a tracking apparatus 100 according to one or more embodiments of the present application. As shown in FIG. 10, the tracking apparatus 100 includes a camera 1001 configured to acquire a tracking image of a to-be-tracked object. Exposure parameters of the camera 1001 are adjusted based on a current tracking distance between the tracking apparatus and the to-be-tracked object. The tracking apparatus 100 may track the to-be-tracked object based on a tracking parameter level suitable for the current tracking distance, so that the recognition rate of a tracking feature may be increased during binocular reconstruction at different tracking distances, thus improving the tracking accuracy of the tracking apparatus for the to-be-tracked object and improving the overall measurement accuracy of a tracking measurement process.

Figure 11:
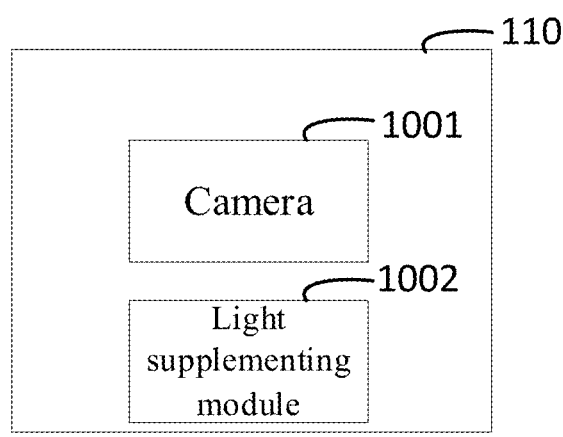
FIG. 11 is a structural block diagram of a tracking apparatus according to one or more embodiments of the present application.

FIG. 11 is a structural block diagram of a tracking apparatus 110 according to one or more embodiments of the present application. As shown in FIG. 11, in addition to the camera 1001, the tracking apparatus 110 further includes a light supplementing module 1002. The light supplementing module 1002 is configured to supplement light when the camera 1001 acquires the tracking image of the to-be-tracked object. A light supplementing parameter of the light supplementing module 1002 is adjusted based on the current tracking distance between the tracking apparatus and the to-be-tracked object. Specifically, the light supplementing module 1002 may be a light supplementing device disposed on the tracking apparatus. For example, the light supplementing device may include a plurality of LEDs. The light supplementing device supplements light for the to-be-tracked object based on the above light supplementing parameter when the camera 1001 acquires the tracking image of the to-be-tracked object.

Figure 12:
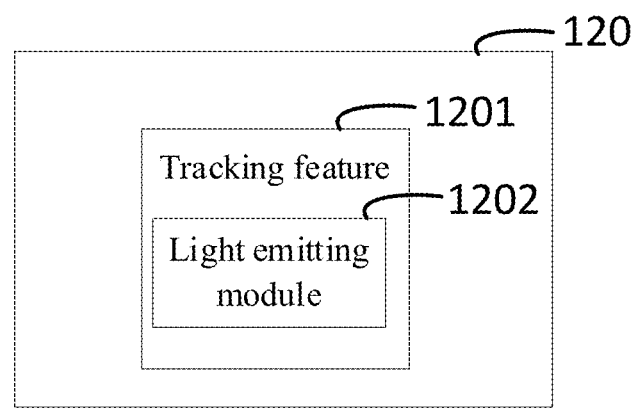
FIG. 12 is a structural block diagram of a measurement apparatus according to one or more embodiments of the present application.

FIG. 12 is a structural block diagram of a measurement apparatus 120 according to one or more embodiments of the present application. As shown in FIG. 12, the measurement apparatus 120 includes a tracking feature 1201 configured to assist a tracking apparatus in positioning the measurement apparatus from an acquired tracking image. In some embodiments, the tracking feature 1201 includes a light emitting module 1202. A light emitting parameter of the light emitting module 1202 is adjusted based on a current tracking distance from the tracking apparatus. The light emitting module 1202 may specifically be an active light emitting source of the tracking feature 1201, such as an LED. In some embodiments, the tracking feature 1201 refers to a marker disposed on the measurement apparatus 120. The marker may be pasted to a surface of the measurement apparatus 120 or may be secured to the surface of the measurement apparatus 120 through a rigid frame.

It is to be noted that specific examples in this embodiment may correspond to the examples described in the above embodiments and optional implementations, which will not be repeated in this embodiment.

It should be understood that the specific embodiments described herein are intended only to explain the application, rather than limit the application. According to the embodiments of the present application, all other embodiments derived by a person of ordinary skill in the art without creative effort fall within the scope of protection of the present application.

It Is to be noted that user information (including, but not limited to, user device information, user personal information, etc.) and data (including, but not limited to, data used for analysis, data stored, data displayed, etc.) involved in the present application are authorized by a user or fully authorized by parties of interest.

Apparently, the accompanying drawings are only examples or embodiments of the present application, and a person of ordinary skill in the art may also apply the present application to other similar situations based on the drawings without creative effort. Furthermore, it is to be understood that although the work done in this development process may be complex and lengthy, changes in design, manufacture or production, etc., based on the technical content disclosed in the present application are only conventional technical means to a person of ordinary skill in the art and should not be considered insufficient for the disclosure of the present application.

The term "embodiment(s)" in the present application indicates that specific features, structures or characteristics described in conjunction with the embodiments may be included in at least one of the embodiments of the present application. The presence of this phrase at various locations in the specification does not necessarily imply the same embodiments, nor does it imply independent or alternative embodiments to other embodiments that are mutually exclusive. It will be clearly or implicitly understood by those of ordinary skill in the art that the embodiments described in the present application may be combined with other embodiments without conflicts.

The above embodiments express only one or more implementations of the present application, which are described in a specific and detailed manner, but are not to be construed as a limitation of the scope of protection of the patent. It should be pointed out that, for a person of ordinary skill in the art, several deformations and improvements may be made without departing from the conception of the present application, all of which fall within the scope of protection of the present application. Therefore, the scope of protection of the present application shall be subject to the appended claims.

What is claimed is:

1. A tracking method for a tracking measurement system comprising a tracking apparatus, the method comprising:
   acquiring a current tracking distance between the tracking apparatus and a to-be-tracked object; and
   determining, based on the current tracking distance, a tracking parameter level for the tracking apparatus,
   wherein the tracking parameter level comprises at least one of:
      a camera exposure parameter for the tracking apparatus; and
      a tracking feature parameter for the to-be-tracked object, the tracking feature parameter comprising:
         a light supplementing parameter when a tracking feature of the to-be-tracked object emits light passively; and a light emitting parameter when the tracking feature emits light actively.

2. The tracking method according to claim 1, further comprising:
acquiring a tracking feature of the to-be-tracked object;
determining, based on the tracking feature of the to-be-tracked object, location information of the to-be-tracked object; and
determining, based on the location information, the current tracking distance between the tracking apparatus and the to-be-tracked object.

3. The tracking method according to claim 2, further comprising:
acquiring, based on a preset initial tracking parameter level, an initial tracking image of the to-be-tracked object; and
determining a tracking feature from the initial tracking image.

4. The tracking method according to claim 1, wherein determining, based on the current tracking distance, a tracking parameter level for the tracking apparatus comprises:
determining, based on the current tracking distance, a corresponding distance interval; and
determining, based on the distance interval, a tracking parameter level for tracking the to-be-tracked object from a preset correspondence, wherein the correspondence is a mapping between a plurality of distance intervals and a plurality of tracking parameter levels.

5. The tracking method according to claim 4, wherein determining, based on the current tracking distance, a corresponding distance interval comprises:
acquiring a previous historical tracking distance between the tracking apparatus and the to-be-tracked object within a preset period of time; and
based on determining that the current tracking distance is outside a distance interval corresponding to the previous historical tracking distance two or more consecutive times, adjusting the distance interval corresponding to the current tracking distance.

6. The tracking method according to claim 4, wherein determining, based on the current tracking distance, a corresponding distance interval comprises:
acquiring a previous historical tracking distance between the tracking apparatus and the to-be-tracked object within a preset period of time; and
based on determining that the previous historical tracking distance within the preset period of time does not exist, determining a distance interval that includes the current tracking distance as the distance interval corresponding to the current tracking distance.

7. The tracking method according to claim 4, wherein determining, based on the current tracking distance, a corresponding distance interval comprises:
acquiring a previous historical tracking distance between the tracking apparatus and the to-be-tracked object within a preset period of time;
based on determining that the previous historical tracking distance within the preset period of time exists, acquiring a steady state interval of a historical distance interval corresponding to the previous historical tracking distance, wherein the steady state interval comprises the distance interval and a buffer interval preset at an end of the distance interval; and
determining, based on a comparison of the current tracking distance with the steady state interval of the historical distance interval, the distance interval corresponding to the current tracking distance.

8. The tracking method according to claim 7, wherein determining, based on a comparison of the current tracking distance with the steady state interval of the historical distance interval, the distance interval corresponding to the current tracking distance comprises:
based on determining that the current tracking distance is included in the steady state interval of the historical distance interval, determining that the current tracking distance corresponds to the same distance interval as the previous historical tracking distance.

9. The tracking method according to claim 7, wherein determining, based on a comparison of the current tracking distance with the steady state interval of the historical distance interval, the distance interval corresponding to the current tracking distance comprises:
based on determining that the current tracking distance is greater than a first limit value of the steady state interval of the previous historical tracking distance, causing the current tracking distance to correspond to a distance interval adjacent to the historical distance interval and having greater distance values; and
based on determining that the current tracking distance is smaller than a second limit value of the steady state interval of the previous historical tracking distance, causing the current tracking distance to correspond to a distance interval adjacent to the historical distance interval and having smaller distance values, wherein the first limit value is greater than the second limit value.

10. The tracking method according to claim 1, wherein the tracking apparatus comprises:
a camera configured to acquire a tracking image of the to-be-tracked object,
wherein an exposure parameter of the camera is adjusted based on the current tracking distance between the tracking apparatus and the to-be-tracked object, and
wherein the exposure parameter includes a shutter time of the camera.

11. The tracking method according to claim 10, wherein the tracking apparatus further comprises:
a light supplementing module configured to supplement light when the camera acquires the tracking image of the to-be-tracked object,
wherein the light supplementing parameter of the light supplementing module is adjusted based on the current tracking distance between the tracking apparatus and the to-be-tracked object.

12. The tracking method according to claim 1, wherein the tracking measurement system comprises a measurement apparatus that further comprises:
the tracking feature configured to assist the tracking apparatus in positioning the measurement apparatus from an acquired tracking image,
wherein the tracking feature comprises a light emitting module,
wherein the light emitting parameter of the light emitting module is adjusted based on the current tracking distance from the tracking apparatus, and
wherein the light emitting parameter includes a light emitting power.

13. A tracking system for tracking measurement, comprising:
a tracking parameter adjustment module configured to:
acquire a current tracking distance between a tracking apparatus and a to-be-tracked object; and determine, based on the current tracking distance, a tracking parameter level for the tracking apparatus, wherein wherein the tracking parameter level comprises at least one of:
- a camera exposure parameter for the tracking apparatus; and
- a tracking feature parameter for the to-be-tracked object, the tracking feature parameter comprising:
  - a light supplementing parameter when a tracking feature of the to-be-tracked object emits light passively; and
  - a light emitting parameter when the tracking feature emits light actively.

14. The tracking system according to claim 13, further comprising:
a tracking distance determination module configured to:
   acquire a tracking feature of the to-be-tracked object;
   determine, based on the tracking feature, location information of the to-be-tracked object; and
   determine, based on the location information, the current tracking distance.

15. The tracking system according to claim 14, further comprising:
a tracking image determination module configured to acquire, based on a preset initial tracking parameter level, an initial tracking image of the to-be-tracked object; and
a tracking feature determination module configured to determine a tracking feature from the initial tracking image.

16. The tracking system according to claim 13, further comprising:
a distance interval determination module configured to determine, based on the current tracking distance, a corresponding distance interval,
wherein the tracking parameter adjustment module is further configured to:
   determine, based on the distance interval, a tracking parameter level for tracking the to-be-tracked object from a preset correspondence, wherein the correspondence is a mapping between a plurality of distance intervals and a plurality of tracking parameter levels.

17. The tracking system according to claim 16, wherein the distance interval determination module is configured to:
acquire a previous historical tracking distance between the tracking apparatus and the to-be-tracked object within a preset period of time; and
based on determining that the current tracking distance is outside a distance interval corresponding to the previous historical tracking distance two or more consecutive times, adjust the distance interval corresponding to the current tracking distance.

18. The tracking system according to claim 16, wherein the distance interval determination module is configured to:
acquire a previous historical tracking distance between the tracking apparatus and the to-be-tracked object within a preset period of time; and
based on determining that the previous historical tracking distance within the preset period of time does not exist, determine a distance interval that includes the current tracking distance as the distance interval corresponding to the current tracking distance.

19. The tracking system according to claim 16, wherein the distance interval determination module is configured to:
acquire a previous historical tracking distance between the tracking apparatus and the to-be-tracked object within a preset period of time;
based on determining that the previous historical tracking distance within the preset period of time exists, acquire a steady state interval of a historical distance interval corresponding to the previous historical tracking distance, wherein the steady state interval comprises the distance interval and a buffer interval preset at an end of the distance interval; and
determine, based on a comparison of the current tracking distance with the steady state interval of the historical distance interval, the distance interval corresponding to the current tracking distance.

20. The tracking system according to claim 19, wherein the distance interval determination module is configured to:
based on determining that the current tracking distance is included in the steady state interval of the historical distance interval, determine that the current tracking distance corresponds to the same distance interval as the previous historical tracking distance.

21. The tracking system according to claim 19, wherein the distance interval determination module is configured to:
based on determining that the current tracking distance is greater than a first limit value of the steady state interval of the previous historical tracking distance, cause the current tracking distance to correspond to a distance interval adjacent to the historical distance interval and having greater distance values; and
based on determining that the current tracking distance is smaller than a second limit value of the steady state interval of the previous historical tracking distance, cause the current tracking distance to correspond to a distance interval adjacent to the historical distance interval and having smaller distance values, wherein the first limit value is greater than the second limit value.

* * * * *